United States Patent [19]
Hwang et al.

[11] Patent Number: 6,027,551
[45] Date of Patent: Feb. 22, 2000

[54] CONTROL OF MERCURY EMISSIONS USING UNBURNED CARBON FROM COMBUSTION BY-PRODUCTS

[75] Inventors: Jiann-Yang Hwang, Houghton, Mich.; Zhenglong Li, Darien, Ill.

[73] Assignee: Board of Control for Michigan Technological University, Houghton, Mich.

[21] Appl. No.: 09/167,790

[22] Filed: Oct. 7, 1998

[51] Int. Cl.⁷ .................. B01D 53/04; B01D 53/64
[52] U.S. Cl. .................. 95/134; 95/58; 95/285
[58] Field of Search .................. 95/58, 62, 134, 95/230, 234, 285

[56] References Cited

U.S. PATENT DOCUMENTS

| | | | |
|---|---|---|---|
| 4,065,271 | 12/1977 | Weckesser et al. | 95/58 |
| 4,196,173 | 4/1980 | deJong et al. | 423/210 |
| 4,273,747 | 6/1981 | Rasmussen | 423/210 |
| 4,889,698 | 12/1989 | Moller et al. | 423/210 |
| 5,047,145 | 9/1991 | Hwang | 209/166 |
| 5,505,766 | 4/1996 | Chang | 95/134 |
| 5,672,323 | 9/1997 | Bhat et al. | 422/172 |
| 5,827,352 | 10/1998 | Altman et al. | 95/58 |

*Primary Examiner*—Robert Spitzer
*Attorney, Agent, or Firm*—Harness, Dickey & Pierce, P.L.C.

[57] ABSTRACT

Mercury emission from a flue gas such as that generated by a coal fired power plant is controlled by injecting into the flue gas unburned carbon purified from ash such as fly ash or wood ash. The unburned carbon adsorbs the mercury and is later removed from the flue gas by a particle separator. The unburned carbon collected from ash is significantly lower in cost compared to activated carbon presently used in such a process. The unburned carbon is concentrated in the sorbent by one or more separation processes used to remove non-carbon particles from the fly ash. These processes include gravity separation, electrostatic separation, froth flotation, magnetic separation and size classification. Mercury adsorption is further increased by oxidation of the carbon surface.

14 Claims, 7 Drawing Sheets

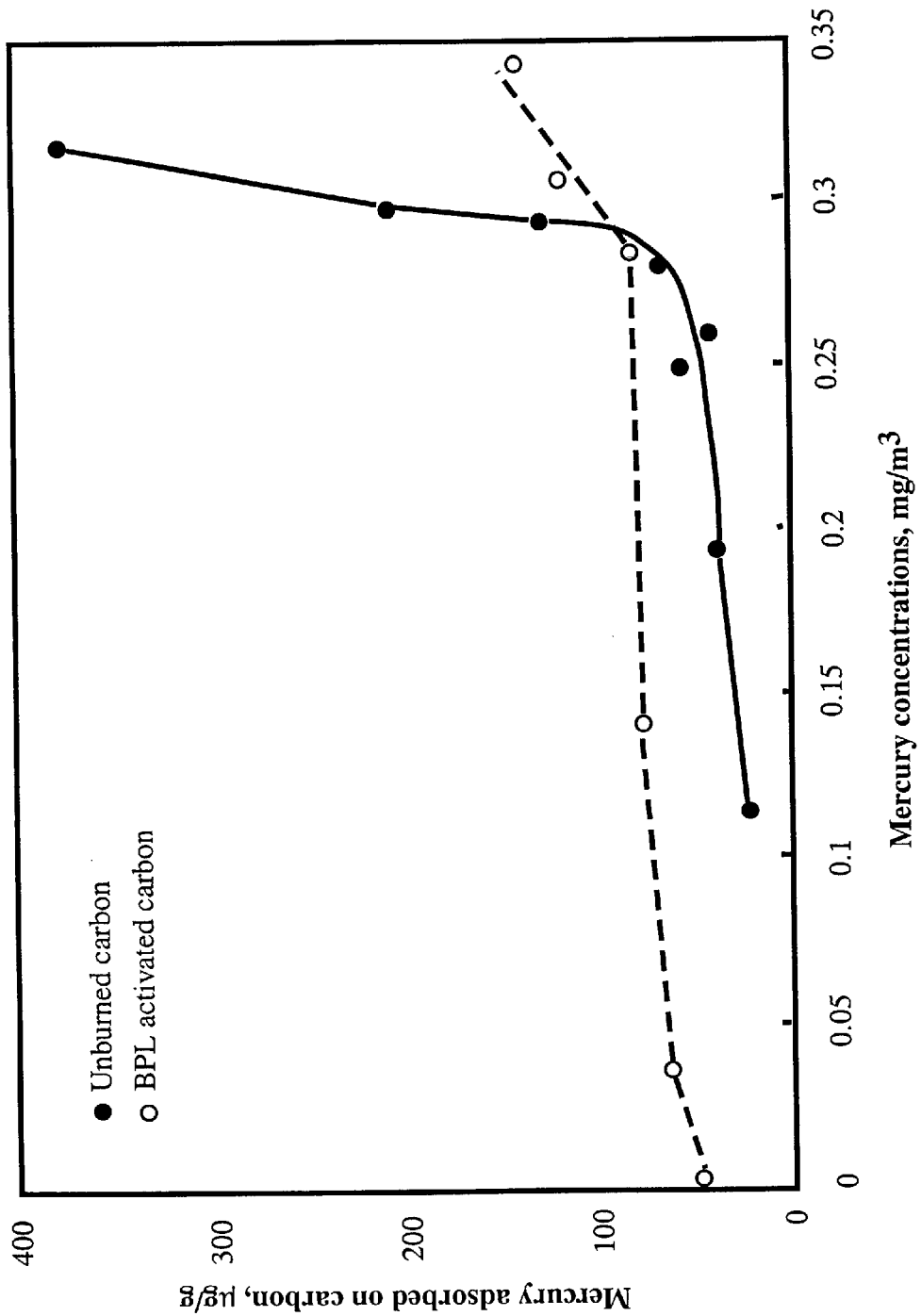
Figure 1. Adsorption of mercury on unburned carbon and activated carbon

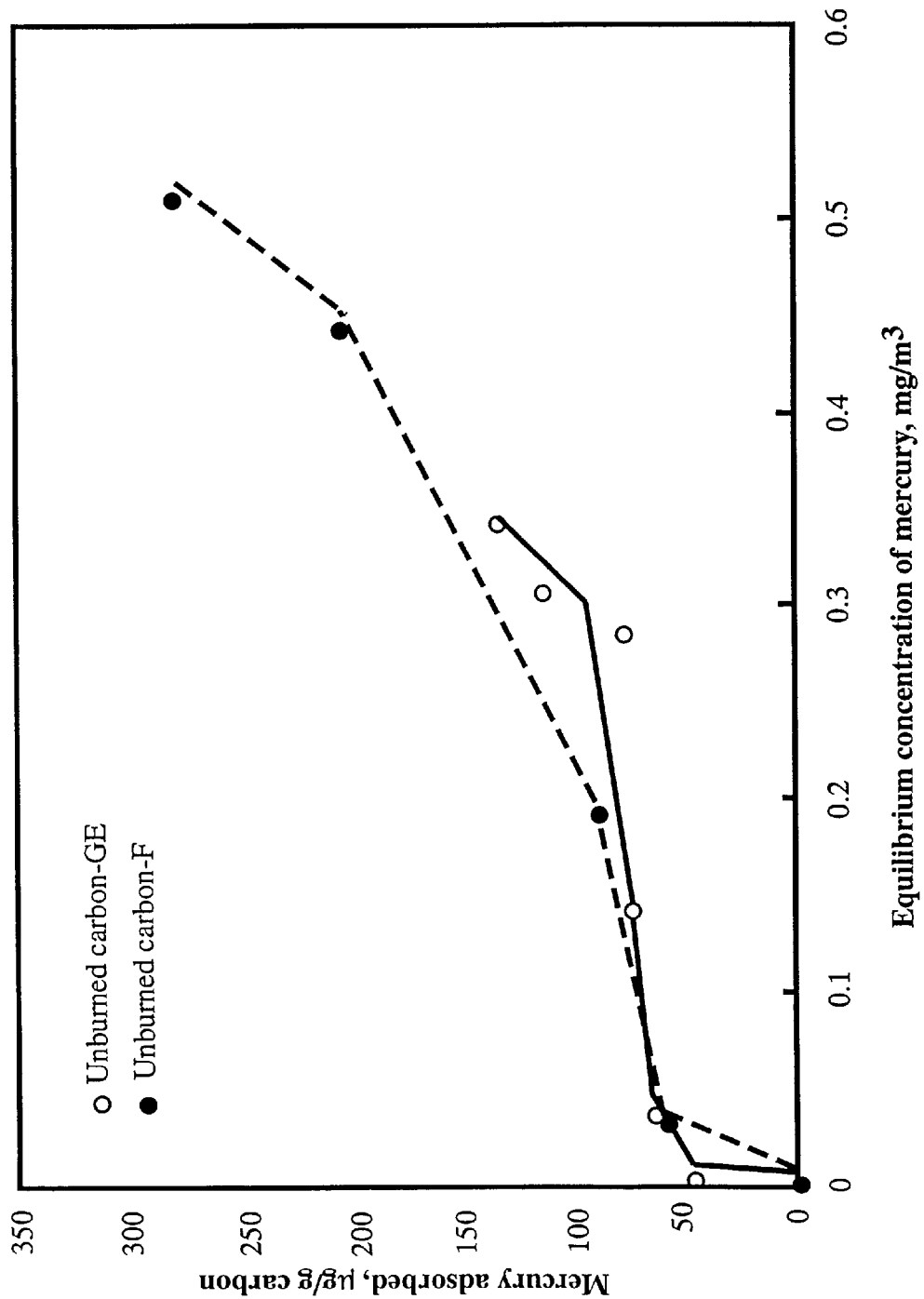
Figure 2. Adsorption of mercury on unburned carbons obtained from gravity-electrostatic separation (Carbon-GE) and froth flotation (Carbon-F)

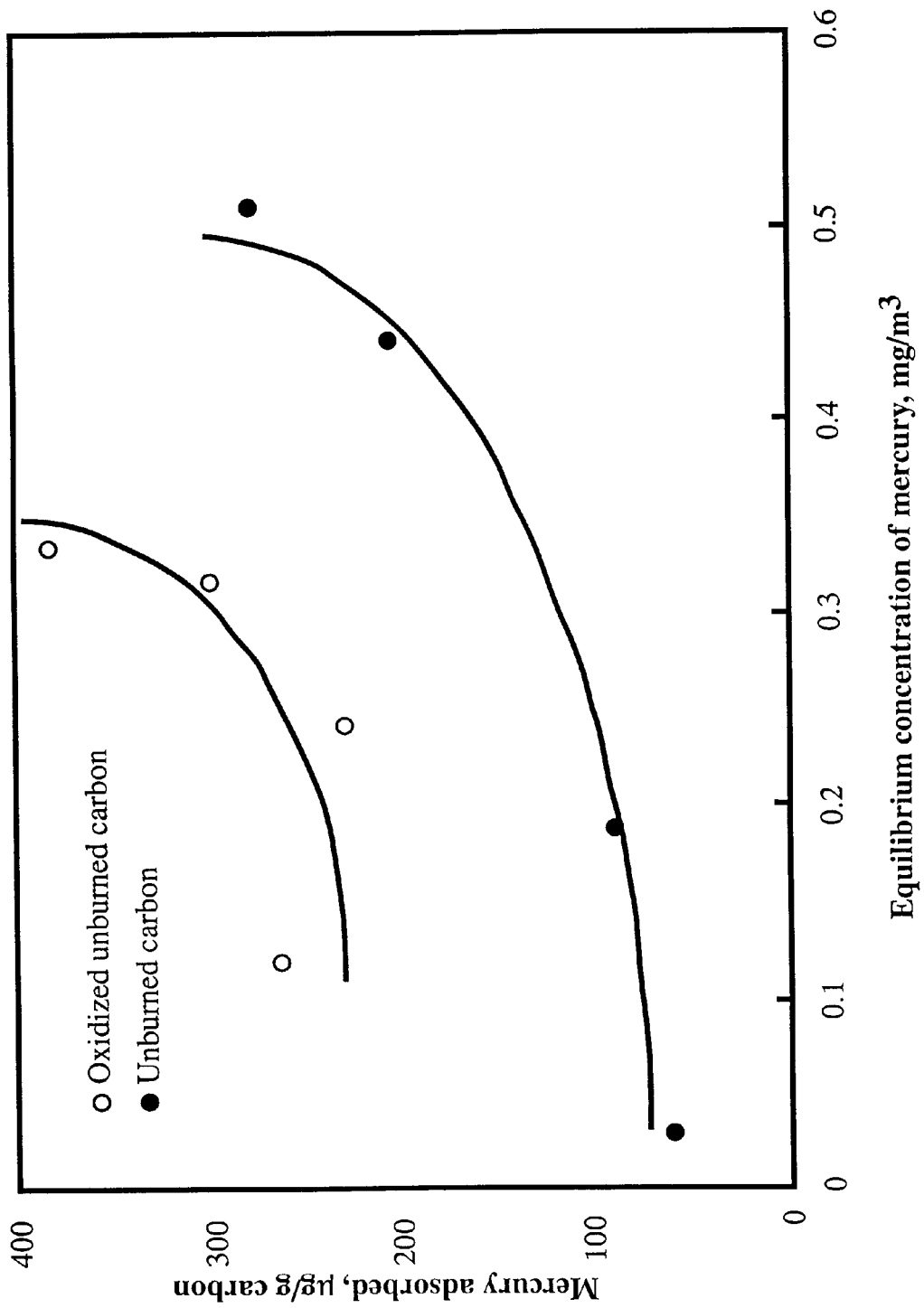
Figure 3. Effects of thermal oxidation on unburned carbons on mercury adsorption

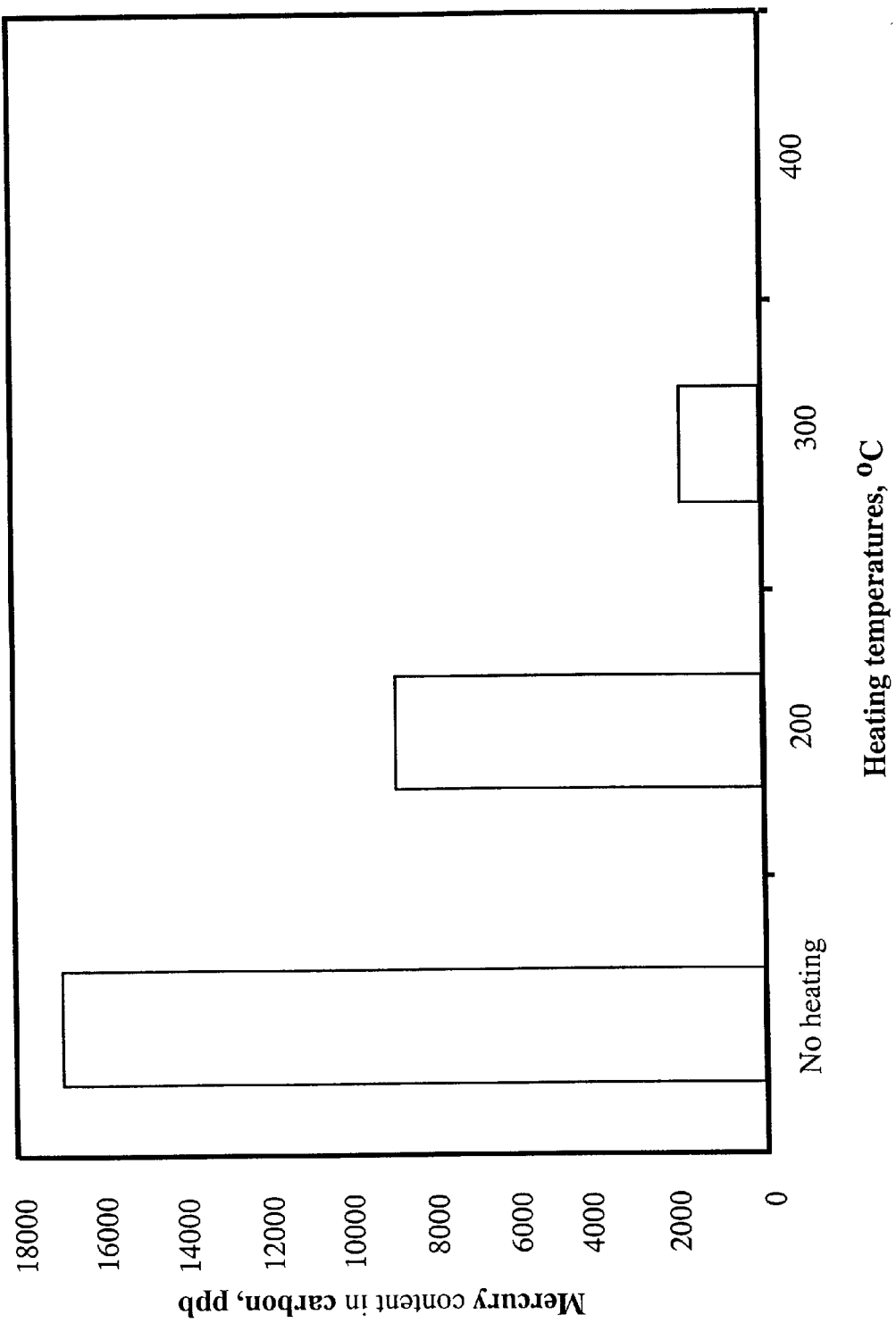
Figure 4. Effects of heating temperature on regeneration of unburned carbon, in nitrogen gas

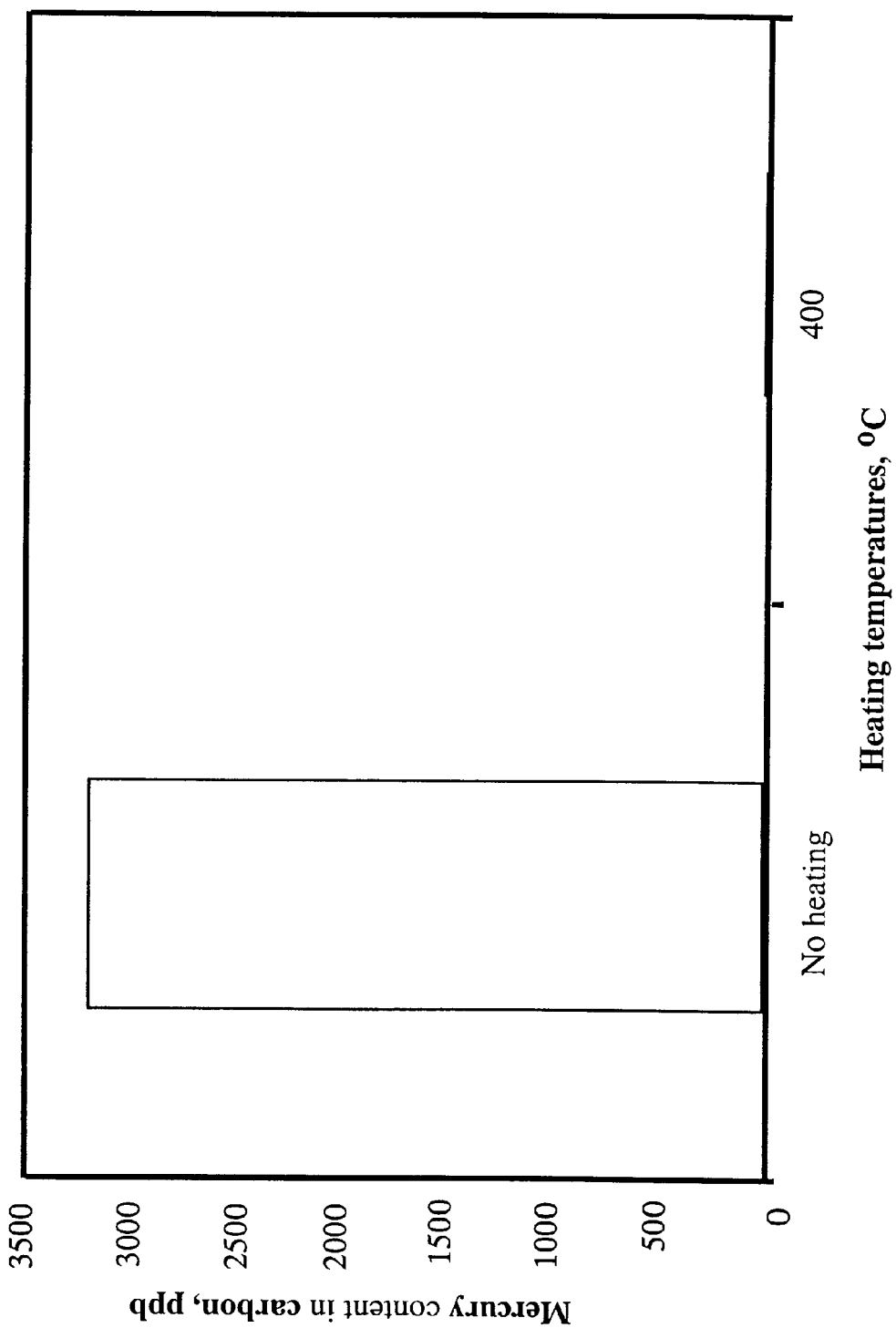
Figure 5. Effects of heating temperature on regeneration of unburned carbon, in air

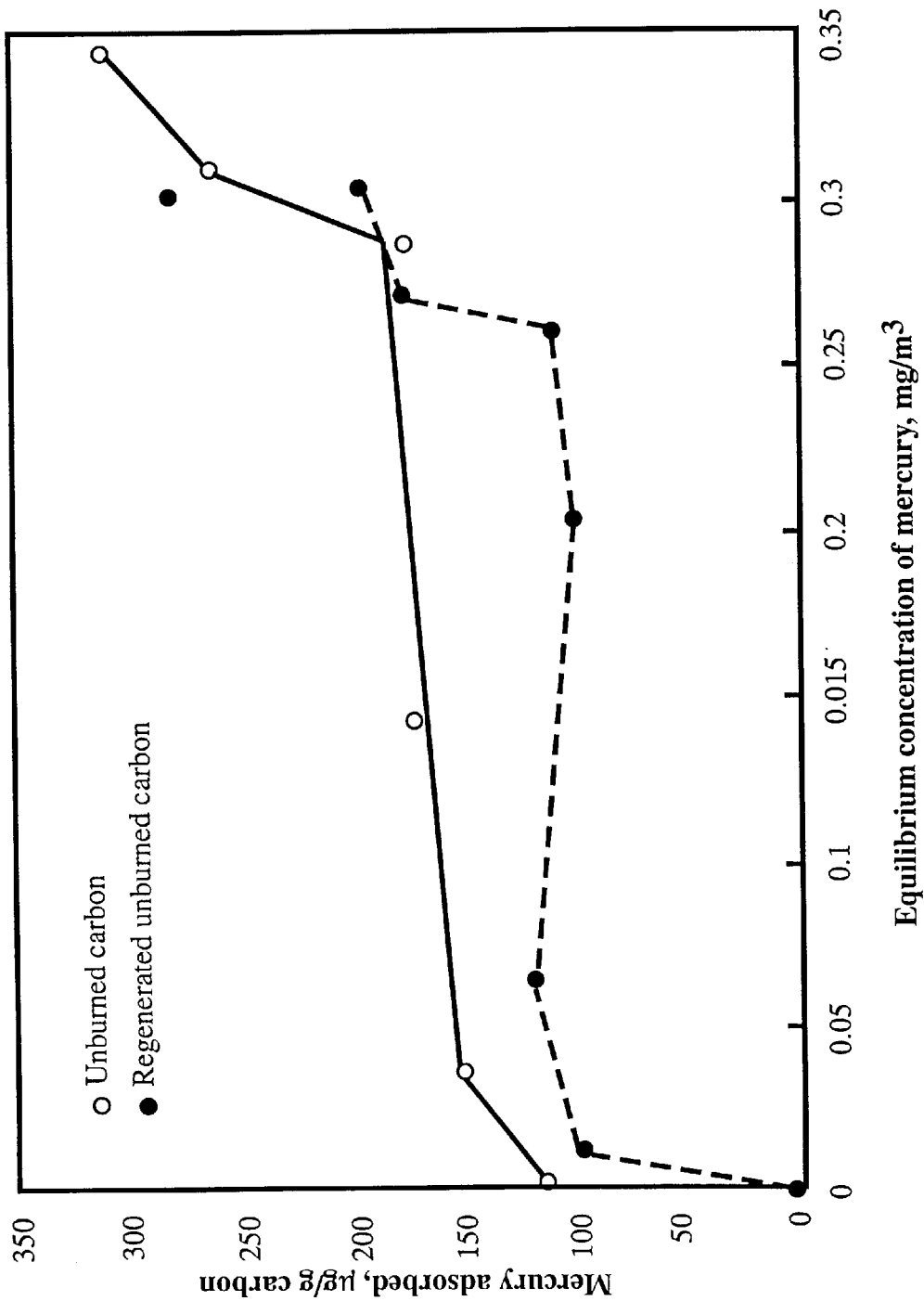
Figure 6. Adsorption of mercury on unburned carbon and regenerated unburned carbon

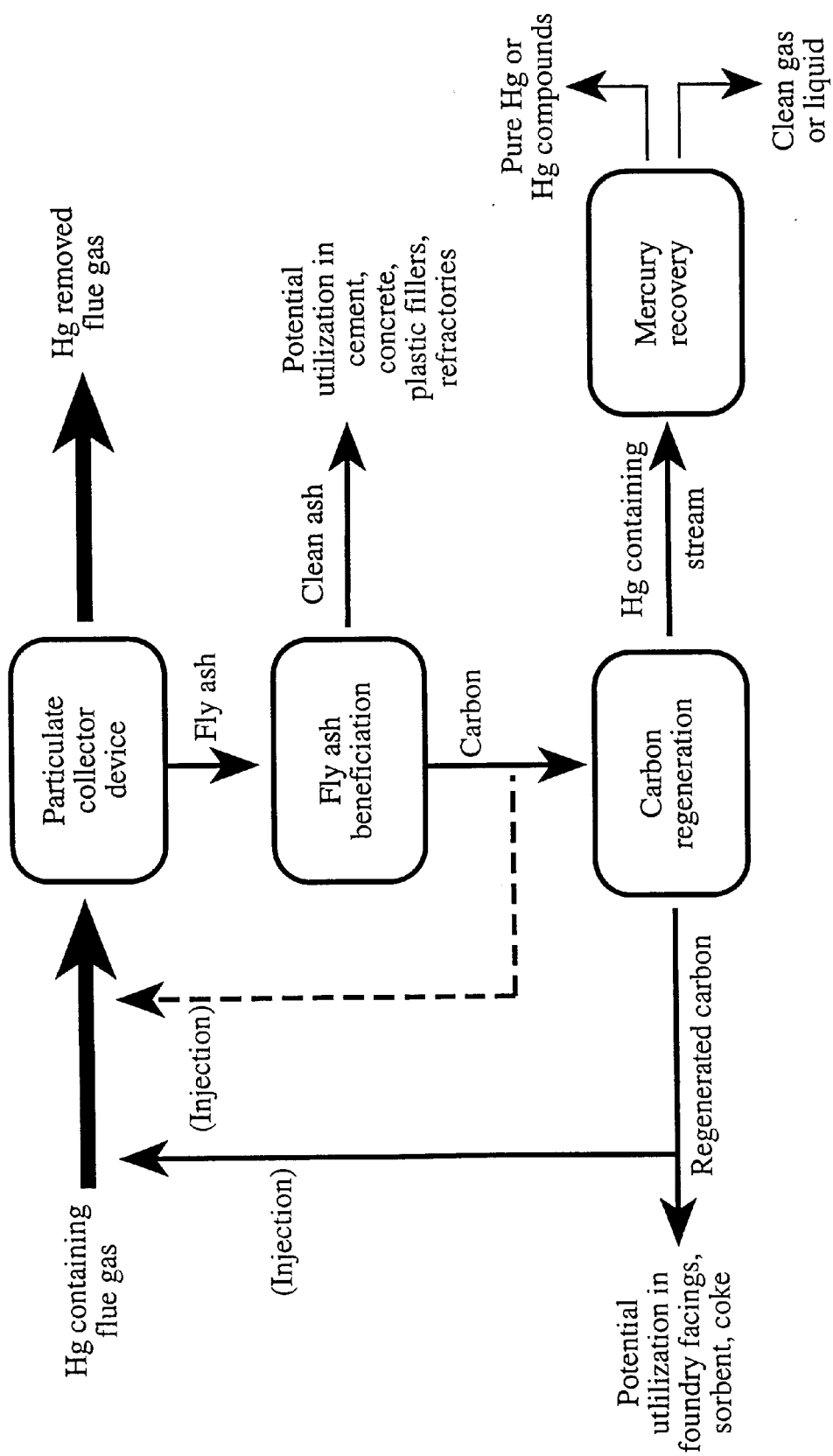
Figure 7. Conceptual flowchart of the proposed MTU mercury removal system

CONTROL OF MERCURY EMISSIONS USING UNBURNED CARBON FROM COMBUSTION BY-PRODUCTS

BACKGROUND AND SUMMARY OF THE INVENTION

Mercury has long been known as a potential health and environmental hazard. Environmental standards for its emissions from coal fired power plants, petroleum and chemical refineries, incinerators, metal extraction operations, and other mercury emitting facilities are becoming increasingly demanding. New regulations are currently under development to reduce the permissible levels of mercury emissions from such facilities. Technologies are under development to meet this challenge. One such technology utilizes activated carbon to control mercury emissions from coal fired power plants. However, cost estimates show that commercialization of this technology would result in a five percent increase in electricity prices and that 95 percent of this increase is due to the cost of activated carbon.

It is an objective of the present invention to find lower cost carbon materials to use to control mercury emissions. Our studies have revealed that unburned carbons in or from fly ash, wood ash, and other charred carbonaceous materials are effective adsorbents for mercury. These carbon sources will be collectively referred to herein as "fly ash". These carbons can be used as a substitute for activated carbon. Compared with activated carbons, the unburned carbons from ash are much less expensive because they are usually combustion by-products. While fly ash may only contain a small percentage of carbon, the technologies to upgrade the ash to a higher carbon content, are cost effective. Surface treatment of the carbon, e.g. surface oxidation, will also enhance its adsorption for mercury.

We have found that the unburned carbons have a similar or higher adsorption capacity for mercury than activated carbon. The reason for this may be due to the pore structure of the carbons and the adsorption characteristics of mercury. In an activated carbon injection system for example, the dry activated carbon is carried by high speed air from an air compressor and sprayed into the flue gas duct, upstream of the particulate collection device. The carbon injection rate has been reported to be 1,000 to 10,000 times the mercury emission rate, with a carbon concentration of 30–80 mg/m$^3$ in flue gas. Factors that affect carbon performance in a carbon injection emission control system include temperature, relative humidity, mercury concentration and other constituents of the flue gas. In the adsorption process, the carbon-mercury contact time is very short and adsorption equilibrium may be difficult to reach. It is anticipated that since the many of the pores in the activated carbon are in the micro-pore range, i.e. less than 2 nanometers, that activated carbon has less chance to adsorb mercury because of diffusion limitations. As a result, the potential adsorption capacity of the activated carbon will not be effectively utilized.

In the case of unburned carbons, the majority of the pores are in the macropore range, i.e. greater than 50 nanometers. Although these carbons have much lower surface area compared to activated carbons (e.g., 15–200 m$^2$/g for one of the fly ash carbons, 500 to 1,000 m$^2$/g for many activated carbons), they may adsorb mercury as effectively as commercial activated carbon in a carbon injection system. This assumes macro-pores to be more important than micro-pores and a minimum sorbent-to-gas ratio to be required in this situation. A minimum solid-to-gas ratio is usually required to ensure the adsorbate molecules, mercury in this case, in the gas phase have a reasonable chance to collide with adsorbent particles.

Compared with activated carbon, unburned carbon is generally low cost with a reasonable adsorptive capacity. Unburned carbon has more macro-pores, which allows the fast adsorption and easy regeneration after loaded. Moreover, the trace and minor elements or compounds present in the unburned carbons may enhance the adsorption of mercury. The primary use of unburned carbon to remove mercury is in the flue gas from coal-fired power plants. However, it can be used to remove mercury from incineration flue gas, natural gas and the ventilation air from chloralkali processes.

Further objects, features and advantages of the invention will become apparent from a consideration of the following description and the appended claims when taken in connection with the accompanying drawings.

BRIEF DESCRIPTION OF THE DRAWINGS

FIG. 1 is a graph comparing the adsorption of mercury on unburned carbon with that of activated carbon;

FIG. 2 is a graph comparing the adsorption of mercury on unburned carbons obtained from ash by two different processes;

FIG. 3 is a graph showing the effects on mercury adsorption of thermal oxidation of the unburned carbons;

FIG. 4 is a bar graph illustrating the effect of heating temperature on regeneration of mercury-laden unburned carbon in a nitrogen atmosphere;

FIG. 5 is a bar graph illustrating the effect of heating temperature on regeneration of mercury-laden unburned carbon in air;

FIG. 6 is a graph comparing the adsorption of mercury between unburned carbon and regenerated unburned carbon; and FIG. 7 is a flow chart diagram of the process of removing mercury from a flue gas stream.

DETAILED DESCRIPTION OF THE PREFERRED EMBODIMENT

There are a variety of unburned carbons, including those in or from fly ash, wood ash, and other charred carbonaceous materials. These carbons are different from activated carbons because no activation process has been involved. Frequently, the unburned carbons require preparation for efficient mercury adsorption. The preparation may involve the use of various physical and chemical separation processes and their combination. These processes include screening, gravity (density) separations; electrostatic or triboelectric separations in which the more conductive carbon is separated from ash and silicate minerals or different electric charges are generated through a triboelectric process; froth flotation to remove carbon as described in U.S. Pat. No. 5,047,145 incorporated herein by reference; magnetic separations to remove iron particles; size classifications to remove the coarser carbon from finer ash particles; etc. For example, one stage wet tabling can upgrade the unburned carbon at +100 mesh in fly ash from 30% LOI (loss on ignition) to more than 60% LOI. Electrostatic separation can further upgrade these carbons to 80% LOI or higher. In another example, the unburned carbon content was upgraded from 2.5% LOI to 65% LOI by three stage froth flotation. Further upgrading to 85% LOI was achieved by slightly grinding the concentrates followed by another three stage froth flotation.

FIG. 1 shows the adsorption capacity of the unburned carbon recovered from an ash source. The carbon content was upgraded by a combination of gravity and electrostatic separation, no chemicals were involved. For comparison, the adsorption capacity of a commercially available activated carbon, BPL, is also included in FIG. 1. It is seen that at low mercury concentrations, 5 to 250 $\mu g/m^3$, corresponding to those of flue gas from coal fired power plants, the unburned carbon has a higher adsorption capacity than the activated carbon. The adsorption capacity of the unburned carbon was as high as from 50 $\mu g/g$ at 5 $\mu g/m^3$ to 70 $\mu g/g$ at 280 $\mu g/m^3$. Under the same condition, the activated carbon only has a capacity of 10 $\mu g/g$ to 50 $\mu g/g$, respectively.

FIG. 2 shows the adsorption capacity of the unburned carbons purified from fly ash by different recovery processes. The unburned carbons were from the same fly ash source but upgraded by different separation techniques. Unburned-carbonGE was upgraded by gravity and electrostatic separation processes. Unburnedcarbon-F was upgraded by froth flotation in which flotation reagents were applied. It is seen that the shape of the curves is essentially the same, and that the adsorption capacity is about identical. This indicates that residual flotation reagents on the carbon surface do not interfere with mercury adsorption and hence the adsorption ability of the unburned carbons is not significantly changed by the preparation methods.

Mercury adsorption of the carbon can be enhanced by oxidation of the unburned carbon surface. The oxygen-enriched sites on the carbon surface are believed to be active for capturing mercury from the surrounding environment. The underlying fundamental is that these oxygen groups will react with mercury to form mercury oxide, which is thermodynamically favorable. Oxygen enrichment of the surface of the unburned carbon can be realized by various techniques, including thermal oxidation in oxygen-rich gas at different temperatures, chemical oxidation using various chemicals such as nitric acid, chlorine, iodine, ozone, ferric salts, and other methods. FIG. 3 depicts this effect in which mercury adsorption on the unburned carbon is enhanced by thermal oxidation of the surface. The unburned carbon was from fly ash and upgraded by froth flotation. The oxidized unburned carbon was from the same sources but thermally oxidized in air at 400° C. The adsorption capacity has been increased by four times when the unburned carbon was thermally oxidized at this temperature. Significant improvement occurs with oxidation temperatures at or above 300° C. The reason for this enhancement is believed to be attributed to the increase of oxygen groups on the carbon surface.

The carbon may be placed on a fixed bed through which the flue gas flows. However, it will most likely be directly injected into the flue gas stream. If directed upstream of the particulate collection device, the carbon is removed with the fly ash in the flue gas. The collected fly ash and carbon is processed to separate the carbon from the ash. The carbon is then regenerated to recover the mercury. The regenerated carbon can then be reinjected into the flue gas stream.

The carbon can also be injected after the fly ash has been removed from the flue gas. This will necessitate a second particulate collection device but the collected carbon will not have to be separated from ash before being regenerated and reinjected into the flue gas. A variety of particulate collection devices can be used such as those conventionally used to remove fly ash particles from flue gas at a coal fired plant.

A conceptual flow chart of the system is presented in FIG. 7 with the carbon injected upstream of the particulate separator. The system consists of separating the mercury-laden carbon from fly ash, regenerating the separated carbon and recovering the mercury, and reinjecting the carbon back into the flue gas.

Desorption of mercury to regenerate the carbon was achieved by both thermal and hydrometallurgical methods. FIGS. 4 & 5 depict the regeneratability of the unburned carbons in nitrogen and in air respectively. The unburned carbon was first loaded with mercury in the same way as for the adsorption tests. The resultant carbon had a mercury concentration of about 18,000 ppb. In desorption tests, the mercury loaded carbon was placed in a laboratory Muffle oven and air or nitrogen gas was applied to control the atmosphere. It is seen from FIGS. 4 & 5 that the mercury loaded carbon can be fully regenerated at a temperature of 400° C. in either nitrogen (FIG. 4) or air (FIG. 5) atmosphere. The mercury content on the carbon after desorption is about 5 ppb. The dependence of regeneration on temperature as shown in these Figures indicates that the adsorption of mercury is both physical and chemical in nature. At low regeneration temperatures, only the physically adsorbed mercury desorbs. The chemically adsorbed mercury did not desorb until the temperature is close to the boiling point of mercury. Reducing the pressure during desorption will result in a decreased temperature required for desorption.

The reusability of unburned carbon after regeneration is depicted in FIG. 6. The regeneration was achieved in air at a temperature of 400° C. The unburned carbon was a fly ash carbon upgraded by gravity and electrostatic separation. In the studied mercury concentration range, the adsorption capacity of the unburned carbon after regeneration is close to that of the virgin unburned carbon: only slightly lower. This indicates that the unburned carbon can be reused for adsorption after regeneration.

It is to be understood that the invention is not limited to the exact construction illustrated and described above, but that various changes and modifications may be made without departing from the spirit and scope of the invention as defined in the following claims.

We claim:

1. A method of removing mercury vapor from a stream of flue gas utilizing unburned carbon collected from ash comprising the steps of:

preparing a carbon sorbent from ash by separating a portion of the non-carbon particles from the ash resulting in a sorbent having a greater concentration of unburned carbon than the original ash;

subsequently introducing the carbon sorbent into a flue gas stream whereby mercury in the flue gas stream is adsorbed by the unburned carbon in the sorbent; and subsequently collecting the mercury-laden carbon sorbent from the flue gas stream.

2. The method of claim 1 further comprising the step of oxidizing the surface of the unburned carbon in the sorbent at an elevated temperature.

3. The method of claim 2 wherein the unburned carbon surface is oxidized at a temperature greater than about 300° C.

4. The method of claim 2 wherein the unburned carbon surface is oxidized at a temperature greater than about 400° C.

5. The method of claim 1 further comprising the step of regenerating the mercury-laden carbon sorbent by heating the carbon sorbent to remove the mercury collected thereon; and introducing the regenerated carbon sorbent into the flue gas stream.

6. The method of claim 5 wherein the sorbent is regenerated by heating to about 300° C. or more.

7. The method of claim 5 wherein the sorbent is regenerated by heating to about 400° C. or more in air.

8. The method of claim 5 wherein the sorbent is regenerated by heating in a nitrogen atmosphere.

9. The method of claim 1 wherein the unburned carbon particles in the sorbent have a surface area in the range of 15 to 200 $m^2/g$.

10. The method of claim 1 wherein the separation process results in the sorbent having at least 60 percent loss on ignition (LOI).

11. The method of claim 1 wherein the separation process results in the sorbent having at least 80 percent loss on ignition (LOI).

12. The method of claim 1 wherein the non-carbon particles are removed from ash to form the carbon sorbent by one or more of gravity separation, electrostatic separation, triboelectric separation, froth flotation separation, magnetic separation and size classification.

13. The method of claim 1 wherein the non-carbon particles are removed from ash to form the carbon sorbent by gravity separation followed by electrostatic separation.

14. The method of claim 1 wherein the non-carbon particles are removed from ash to form the carbon sorbent by froth floatation followed by grinding followed by additional froth floatation.

* * * * *